US012651714B2

(12) United States Patent
Tannhäuser

(10) Patent No.: US 12,651,714 B2
(45) Date of Patent: Jun. 9, 2026

(54) CIRCUIT BREAKER AND METHOD

(71) Applicant: Siemens Aktiengesellschaft, Munich (DE)

(72) Inventor: Marvin Tannhäuser, Hausen (DE)

(73) Assignee: Siemens Aktiengesellschaft, Munich (DE)

( * ) Notice: Subject to any disclaimer, the term of this patent is extended or adjusted under 35 U.S.C. 154(b) by 158 days.

(21) Appl. No.: 18/696,494

(22) PCT Filed: Sep. 12, 2022

(86) PCT No.: PCT/EP2022/075225
§ 371 (c)(1),
(2) Date: Mar. 28, 2024

(87) PCT Pub. No.: WO2023/052105
PCT Pub. Date: Apr. 6, 2023

(65) Prior Publication Data

US 2024/0379301 A1 Nov. 14, 2024

(30) Foreign Application Priority Data

Sep. 28, 2021 (DE) ..................... 10 2021 210 833.4

(51) Int. Cl.
*H01H 9/54* (2006.01)

(52) U.S. Cl.
CPC .................................. *H01H 9/548* (2013.01)

(58) Field of Classification Search
CPC ........ H01H 9/547; H01H 9/548; H01H 71/12; H01H 71/125

(Continued)

(56) References Cited

U.S. PATENT DOCUMENTS 11,538,642 B2 12/2022 Hussmann
2020/0083699 A1* 3/2020 Kennedy ............. H02H 7/0833
(Continued)

FOREIGN PATENT DOCUMENTS

AU 2019253361 B2 2/2024
DE 202009014759 U1 * 2/2010 ............ H01H 9/548
(Continued)

OTHER PUBLICATIONS

Machine translation of E. Dold & Sohne German Patent Document DE 202009014759 U1 Feb. 2010 (Year: 2010).*
(Continued)

*Primary Examiner* — Kevin J Comber
(74) *Attorney, Agent, or Firm* — Laurence A. Greenberg; Werner H. Stemer; Ralph E. Locher

(57) ABSTRACT

A circuit breaker for protecting an electric low-voltage circuit includes a housing with grid and load-side terminals, and a mechanical break contact unit series-connected to an electronic interruption unit. The break contact unit pairs with the load-side terminal, and the interruption unit pairs with the grid-side terminal. The current level in the low-voltage circuit, between the grid and load-side phase conductor terminals, is ascertained. Preventing current flow in the low-voltage circuit is initiated upon exceeding current and/or current/time thresholds. A measurement impedance between wires of the low-voltage circuit is connected to the connection between the break contact unit and the interruption unit. While contacts of the break contact unit are open and the interruption unit switches to high-ohmic state, the interruption unit switches to low-ohmic state for a period to check functionality of the circuit breaker.

22 Claims, 7 Drawing Sheets

(58) Field of Classification Search
USPC .......................................................... 361/115
See application file for complete search history.

(56) References Cited

U.S. PATENT DOCUMENTS

| | | | | |
|---|---|---|---|---|
| 2020/0366078 | A1* | 11/2020 | Telefus | H02H 1/0092 |
| 2021/0066013 | A1* | 3/2021 | Kumar | H01H 71/123 |
| 2021/0296059 | A1* | 9/2021 | Hussmann | H01H 9/02 |
| 2022/0139644 | A1* | 5/2022 | Niehoff | H02H 9/02 200/42.01 |
| 2024/0379301 | A1 | 11/2024 | Tannhäuser | |
| 2024/0387121 | A1 | 11/2024 | Döbler | |
| 2024/0404766 | A1 | 12/2024 | Tannhäuser | |
| 2024/0404768 | A1 | 12/2024 | Tannhäuser | |

FOREIGN PATENT DOCUMENTS

| | | | |
|---|---|---|---|
| DE | 102018209114 | B3 | 3/2019 |
| DE | 102018213354 | A1 | 2/2020 |
| DE | 102020104970 | A1 | 8/2021 |
| DE | 102021210829 | A1 | 3/2023 |
| DE | 102021210833 | A1 | 3/2023 |
| EP | 3664116 | A1 | 6/2020 |
| WO | 2009095304 | A1 | 8/2009 |
| WO | 2015028634 | A1 | 3/2015 |
| WO | 2015086437 | A1 | 6/2015 |
| WO | 2019197740 | A1 | 10/2019 |
| WO | 2020178032 | A1 | 9/2020 |
| WO | 2021112870 | A1 | 6/2021 |
| WO | 2023041196 | A1 | 3/2023 |
| WO | 2023052041 | A1 | 4/2023 |
| WO | 2023052108 | A1 | 4/2023 |

OTHER PUBLICATIONS

International Electrotechnical Commission, Low-voltage switchgear and controlgear—Part 10: Semiconductor circuit-breakers, Aug. 27, 2020, p. 1-101, International Electrotechnical Commission, IEC.

UL LLC, Outline of Investigation for Solid State Molded-Case Circuit Breakers, May 1, 2019, p. 1-9, UL LLC.

* cited by examiner

SG
Energy Supply
GEH
LG
GRID
NG
Housing
NT
SS
Fuse
Second Voltage
Sensor Unit
SU2
V
SE
Current
Sensor
Unit
SI
A
Control Unit
First
Voltage
Sensor
Unit
EUG
SU1
V
on
off
Electronic
Interruption
Unit EU
EUL
Measuring
Impedance
ZM
APLG
APNG
KKL
KKN
MK
HH
Mechanical Break
Contact Circuit
APLL
APNL
Circuit Breaker
LL
LOAD
NL

CIRCUIT BREAKER AND METHOD

FIELD AND BACKGROUND OF THE INVENTION

The invention relates to the technical field of a circuit breaker for a low-voltage circuit having an electronic interrupt unit and a method for a circuit breaker for a low-voltage circuit having an electronic interrupt unit.

Low voltage means voltages of up to 1000 volts alternating voltage or up to 1500 volts direct voltage. Low voltage in particular means voltages which are greater than the small voltage, with values of 50 volts alternating voltage or 120 volts DC voltage.

Low-voltage circuit or grid or system means circuits with nominal currents or rated currents of up to 125 amperes, more specifically up to 63 amperes. Low-voltage circuit in particular means circuits with nominal currents or rated currents of up to 50 amperes, 40 amperes, 32 amperes, 25 amperes, 16 amperes or 10 amperes. The current values mentioned in particular mean nominal, rated or/and interrupting currents, i.e. the current which is normally carried at maximum via the circuit or at which the electric circuit is usually interrupted, for example by means of a protective device, such as a circuit breaker, line protection circuit breaker or power circuit breaker. The nominal currents can further be graded from 0.5 A via 1 A, A, 3 A, 4 A, 5 A, 6 A, 7 A, 8 A, 9 A, 10 A, etc. up to 16 A.

Line protection circuit breakers are overcurrent protective devices that have been known for a long time, which are used in low-voltage circuits in electrical installation technology. These protect lines from damage due to heating as a consequence of excessive current and/or short circuit. A line protection circuit breaker can automatically interrupt the circuit in the case of overload and/or short circuit. A line protection circuit breaker is a safety element that does not reset automatically.

Power circuit breakers are, in contrast to power circuit breakers, provided for currents greater than 125 A, in some cases also even from 63 amperes. Line protection circuit breakers are therefore of simpler and more delicate design. Line protection circuit breakers usually have a fastening option for fastening to what is known as a top-hat rail (mounting rail, DIN rail, TH35).

Line protection circuit breakers are electromechanically constructed. In a housing, they have a mechanical switching contact or shunt release for interrupting (tripping) the electric current. Usually, a bimetal protective element or bimetal element is used for tripping (interruption) in the case of longer-lasting overcurrent (overcurrent protection) or in the case of thermal overload (overload protection). An electromagnetic trigger having a coil is used for short-term tripping in the event of an overcurrent limit value being exceeded or in the event of a short circuit (short circuit protection). One or more arc quenching chamber(s) or devices are provided for arc quenching. Further, connector elements for wires of the electrical circuit to be protected.

Circuit breakers having an electronic interrupt unit are relatively novel developments. These have a semiconductor-based electronic interrupt unit. That is to say, the electrical current flow of the low-voltage circuit is carried via semiconductor components or semiconductor switches which can interrupt the electrical current flow or be turned on. Circuit breakers having an electronic interrupt unit further frequently have a mechanical break contact system, particularly having disconnecter properties according to relevant standards for low-voltage circuits, wherein the contacts of the mechanical break contact system are connected in series to the electronic interrupt unit, i.e. the current of the low-voltage circuit that is to be protected is carried both via the mechanical break contact system and via the electronic interrupt unit.

The present invention relates in particular to low-voltage AC circuits, having an alternating voltage, usually having a time-dependent sinusoidal alternating voltage with the frequency f. The time dependence of the instantaneous voltage value u (t) of the alternating voltage is described by the equation:

$$u(t) = U * \sin(2\pi * f * t).$$

Where $u(t)$ = instantaneous voltage value at time $t$ $U$ = amplitude of the voltage A harmonic alternating voltage can be shown by the rotation of a pointer, the length of which corresponds to the amplitude (U) of the voltage. The instantaneous deflection is in this case the projection of the pointer onto a coordinate system. A period of oscillation corresponds to a full rotation of the pointer and the full angle thereof is 2π (2 pi) or 360°. The angular frequency is the rate of change of the phase angle of this rotating pointer. The angular frequency of a harmonic oscillation is always 2π-times its frequency, i.e.:

$$\omega = 2\pi * f = 2\pi/T = \text{angular frequency of the alternating voltage}$$

($T$ = period of the oscillation)

The specification of the angular frequency (ω) with respect to the frequency (f) is often preferred, as many formulae of the theory of oscillation can be represented in a more compact manner with the aid of the angular frequency owing to the occurrence of trigonometric functions, the period of which per definition is 2π:

$$u(t) = U * \sin(\omega t)$$

The term instantaneous angular frequency is also used in the event of angular frequencies that are not constant over time.

In the case of a sinusoidal alternating voltage, which is constant over time in particular, the time-dependent value from the angular speed ω and the time t corresponds to the time-dependent angle φ(t) which is also termed the phase angle φ(t). That is to say, the phase angle φ(t) periodically runs through the range 0 . . . 2π or 0° . . . 360°. That is to say the phase angle periodically assumes a value between 0 and 21 or 0° and 360° (φ=n*(0 . . . 2π) or φ=n*(0° . . . 360°) owing to periodicity; in short: φ=0 . . . 2π or φ=0° . . . 360°).

The instantaneous voltage value u (t) consequently means the instantaneous value of the voltage at time t, i.e. in the case of a sinusoidal (periodic) alternating voltage, the value of the voltage at phase angle φ(φ=0 . . . 2π or φ=0° . . . 360°) of the respective period).

SUMMARY OF THE INVENTION

The object of the present invention is to improve a circuit breaker of the type mentioned in the introduction, particularly to improve the safety of a circuit breaker of this type or to achieve higher safety in the electrical low-voltage circuit which is to be protected by the circuit breaker.

This object is achieved by a circuit breaker having the features described below and by a method having the steps described below.

According to the invention, a circuit breaker for protecting an electrical low-voltage circuit, particularly low-voltage AC circuit, is proposed, having:

- a housing having at least one grid-side terminal and one load-side terminal,
- a mechanical break contact unit which is connected in series with an electronic interrupt unit, wherein the mechanical break contact unit is assigned to the load-side terminal and the electronic interrupt unit is assigned to the grid-side terminal,
- wherein the mechanical break contact unit can be switched by opening contacts for avoiding a current flow or closing the contacts for a current flow in the low-voltage circuit,
- wherein the electronic interrupt unit can be switched by semiconductor-based switching elements into a high-resistance state of the switching elements for avoiding a current flow or a low-resistance state of the switching elements for current flow in the low-voltage circuit,
- a current sensor unit for determining the level of the current of the low-voltage circuit,
- a control unit which is connected to the current sensor unit, the mechanical break contact unit and the electronic interrupt unit, wherein avoidance of a current flow of the low-voltage circuit is initiated if current or/and current/time limit values are exceeded.

According to the invention, a measuring impedance is provided between two wires of the low-voltage circuit. On one side, the measuring impedance is connected to the connection between mechanical break contact unit and electronic interrupt unit. On the other side, the measuring impedance is connected to the other wire, in particular to the other wire at the grid-side terminal.

The circuit breaker is designed in such a manner according to the invention that to function test the circuit breaker when contacts of the mechanical break contact unit are open and the electronic interrupt unit is switched to high resistance, the electronic interrupt unit (EU) is switched to a low-resistance state for a first time period. That is to say the electronic interrupt unit is switched, starting from a high-resistance state, to the low-resistance state for a first time period and is subsequently switched back in the high-resistance state.

The first time period can lie in the range of 100 μs to 1 s. For example 100 μs, 200 μs, . . . , 1 ms, 2 ms, . . . , 10 ms, ms, . . . 20 ms, 21 ms, . . . , 100 ms, . . . , 200 ms, . . . 1 s.

In the case of switching times in the range 1 ms to 2 ms, a voltage change can be detected for the function test. In the case of time periods of 20 ms to 100 ms or 1 second, it is possible to check (multiple times) whether for example 0 V voltage (instantaneous or also effective value of the voltage) is applied across the electronic interrupt unit.

This has the particular advantage that the electronic interrupt unit can be checked with regard to its “ability to be switched on and switched-on state”.

Advantageous embodiments of the invention are specified in the subordinate claims and in the exemplary embodiment.

In an advantageous embodiment of the invention, the circuit breaker is designed in such a manner that (for one wire) the level of the voltage can be determined across the electronic interrupt unit.

This has the particular advantage that specifically the level of the voltage between grid-side connecting point and load-side connecting point of the electronic interrupt unit can be determined or is determined.

In an advantageous embodiment of the invention, during the switching (operation) of the electronic interrupt unit to the low-resistance state for the first time period, the level of the voltage is determined across the electronic interrupt unit. If a second voltage threshold value is exceeded, a second fault condition exists, so the electronic interrupt unit becoming low-resistance a further or subsequent time is avoided or/and closing of the contacts is avoided. (That is to say, there is no fault condition present if a value falls below the second voltage threshold value.)

The first voltage threshold value should preferably be less than 1 V. The first voltage threshold value can be between 0 volt (or greater than 0 volt) and less than (e.g. 10% less than) the instantaneous value of the instantaneously applied alternating voltage (specifically in the case of monitoring or comparing instantaneous values).

This has the particular advantage that the electronic interrupt unit can be checked, more precisely with regard to its “ability to be switched on” or the switched-on state.

In an advantageous embodiment of the invention, the circuit breaker is designed in such a manner that when contacts of the mechanical break contact unit are open, the level of the voltage across the electronic interrupt unit is determined when the electronic interrupt unit is switched to high-resistance. If a value falls below a first voltage threshold value, a first fault condition exists, so the electronic interrupt unit becoming low-resistance (possibly again or for the first time) is avoided or/and closing of the contacts is avoided. (That is to say, there is no fault condition present if the first voltage threshold value is exceeded.)

The first voltage threshold value could be an effective value/mean value/rms value of the alternating voltage. The first voltage threshold value could be an instantaneous value of the voltage. The comparison can take place by means of effective values or by means of temporal instantaneous values.

This is used for checking the electronic interrupt unit with regard to its “ability to be switched off or the switched-off state”, i.e. the semiconductor-based switching elements becoming high-resistance or being high-resistance.

The first voltage threshold value is for example advantageously 5-15% of the nominal voltage or applied voltage of the low-voltage circuit, for example 10%. This applies both for effective values and for instantaneous values of the alternating voltage, depending on the chosen type of comparison. For example, the alternating voltage can also be measured at certain times of the instantaneous value. For example, at the time where the instantaneous value of the alternating voltage is +300 V or −300 V.

This has the particular advantage that there is a simple check with regard to the single-pole switch behavior of the electronic interrupt unit.

In an advantageous embodiment of the invention, closing of the contacts of the mechanical break contact unit is avoided if one fault condition (of the two) exists. In particular, no approval signal (enable) is output to the mechanical break contact unit. That is to say, closing of the contacts of the mechanical break contact unit by means of a handle is not possible.

Furthermore, the electronic interrupt unit becoming low-resistance can be avoided.

Further fault conditions may also exist.

This has the particular advantage that only a functional circuit breaker can be switched on using a functional electronic interrupt unit. Therefore, the operational reliability in the low-voltage circuit is increased. Thus, it is ensured that the ability to switch on and the ability to switch off of the electronic interrupt unit is functional.

In an advantageous embodiment of the invention, the circuit breaker can further be designed in such a manner that further refinements are provided:

one housing having a grid-side neutral wire terminal, a grid-side phase wire terminal, a load-side neutral wire terminal, a load-side phase wire terminal of the low-voltage circuit, a, particularly two-pole (specifically in the case of a single-phase circuit), mechanical break contact unit having load-side terminal points and grid-side terminal points, wherein the load-side terminal points are connected to the load-side neutral and phase wire terminals, so that it is possible to engage an opening of contacts for avoiding a current flow or a closing of the contacts for a current flow in the low-voltage circuit, an, in particular single-pole, electronic interrupt unit, having a grid-side connecting point which is in electrical connection with the grid-side phase wire terminal, and a load-side connecting point which is connected to a grid-side terminal point of the mechanical break contact unit, wherein, due to semiconductor-based switching elements, the electronic interrupt unit has a high-resistance state of the switching elements for avoiding a current flow or a low-resistance state of the switching elements for current flow in the low-voltage circuit, a current sensor unit for determining the level of the current of the low-voltage circuit, a control unit which is connected to the current sensor unit, the mechanical break contact unit and the electronic interrupt unit, wherein avoidance of a current flow of the low-voltage circuit is initiated if current or/and current/time limit values are exceeded.

According to the invention, the level of the voltage between grid-side connecting point and load-side connecting point of the electronic interrupt unit can be or is determined.

To this end, at least one voltage sensor unit, which is connected to the control unit, can be provided. In the case of a plurality of voltage sensor units, these are connected to the control unit.

With the determination of the level of the voltage across the electronic interrupt unit, the functionality of the electronic interrupt unit can be determined according to the invention. According to the invention, increased operational reliability of a circuit breaker is therefore achieved. Furthermore, a novel architecture or structural embodiment of a circuit breaker is proposed.

In an advantageous embodiment of the invention, a first voltage sensor unit is provided, which is connected to the control unit and which determines the level of a/the first voltage across the electronic interrupt unit, particularly between grid-side connecting point and load-side connecting point of the electronic interrupt unit.

This has the particular advantage that there is a simple solution having only one voltage sensor unit.

In an advantageous embodiment of the invention, a second voltage sensor unit is alternatively provided, which is connected to the control unit and which determines the level of a second voltage between grid-side neutral wire terminal and grid-side phase wire terminal. Furthermore, a third voltage sensor unit is provided, which is connected to the control unit and which determines the level of a third voltage between grid-side neutral wire terminal and load-side connecting point of the electronic interrupt unit. The circuit breaker is designed in such a manner that the level of a/the first voltage between grid-side connecting point and load-side connecting point of the electronic interrupt unit is determined from the difference between second and third voltage.

This has the particular advantage that there is a further solution based on classic voltage measurements. In addition, a further-reaching test of the circuit breaker is enabled.

In an advantageous embodiment of the invention, the current sensor unit is provided at the circuit between grid-side phase wire terminal and load-side phase wire terminal.

This has the particular advantage that there is a compact division of the device in two, having an electronic interrupt unit in the phase wire next to the current sensor unit on one side and a continuous neutral wire on the other side. Furthermore, a further-reaching monitoring is achieved using a current sensor unit in the phase wire with regard to currents both in the circuit itself and in the event of ground fault currents.

In an advantageous embodiment of the invention, a measuring impedance is connected in particular between the grid-side terminal points of the mechanical break contact unit. In particular, the measuring impedance is an electrical resistor or/and capacitor, i.e. a single element or a series or parallel connection of two elements.

Specifically, the measuring impedance should have a high resistance value or impedance value in order to advantageously keep the losses low. In particular, resistance values of greater than 100 kohms, better 1 Mohm, 2 Mohms, 3 Mohms, 4 Mohms or 5 Mohms, specifically of greater than 5 Mohms, should be provided. In a 230 volt low-voltage circuit, the use of a measuring resistance of e.g. 1 Mohm leads to approximately 50 mW losses.

This has the particular advantage that there is a better check of the functionality of the electronic interrupt unit, particularly in the case of open break contacts, specifically in the case of the architecture of the circuit breaker according to the invention.

In an advantageous embodiment of the invention, the low-voltage circuit is a three-phase AC circuit. The circuit breaker has a plurality of or further grid-side and load-side phase wire terminals in order to protect the phases of the electrical circuit. In each case, an electronic interrupt unit with voltage determination according to the invention, particularly first voltage sensor units, is provided between each of the grid-side and load-side phase wire terminals. In addition, a contact of the mechanical break contact unit is provided between each of the grid-side and load-side phase wire terminals. This has the particular advantage that protection for a three-phase AC circuit is enabled.

In an advantageous embodiment of the invention, the circuit breaker is designed in such a manner that the contacts of the mechanical break contact unit can be opened by the control unit, but not closed.

This has the particular advantage that increased operational reliability is achieved, as the contacts cannot inadvertently be closed by the control unit.

In an advantageous embodiment of the invention, the mechanical break contact unit can be operated by a mechanical handle in order to engage an opening of contacts or a closing of the contacts.

This has the particular advantage that there is the functionality of a classic line protection circuit breaker.

In an advantageous embodiment of the invention, the mechanical break contact unit is designed in such a manner that closing of the contacts by the mechanical handle is only possible after an approval (enable), particularly an approval signal.

This has the particular advantage that there is increased protection and increased operational reliability, as a switch-on of a defective circuit breaker is avoided.

In an advantageous embodiment of the invention, an energy supply, particularly for the control unit, is provided, which is connected to the grid-side neutral wire terminal and the grid-side phase wire terminal. Specifically, a fuse, in particular a melting fuse, is provided in the connection for the neutral wire terminal. Advantageously, the measuring impedance can specifically be connected to the grid-side neutral wire terminal via the fuse.

This has the particular advantage that a compact electronic module is enabled. Furthermore, there is only one cross connection in the circuit breaker between phase wire and neutral wire. A fault in the circuit breaker which causes a short circuit between phase wire and neutral wire can thus easily be protected, secured or found.

In an advantageous embodiment of the invention, when contacts of the mechanical break contact unit are closed and the interrupt unit is low-resistance, and

- when a current is determined, which exceeds a first current value, in particular in that the first current value is exceeded for a first time limit, the electronic interrupt unit becomes high-resistance and the mechanical break contact unit stays closed,
- when a current is determined, which exceeds a (higher) second current value, in particular for a second time limit, the electronic interrupt unit becomes high-resistance and the mechanical break contact unit is opened,
- when a current is determined, which exceeds an (even higher) third current value, the electronic interrupt unit becomes high-resistance and the mechanical break contact unit is opened.

This has the particular advantage that a graded switch-off concept exists for a circuit breaker according to the invention in the case of increased currents.

In an advantageous embodiment of the invention, the control unit has a microcontroller.

This has the particular advantage that the functions according to the invention for increasing the safety of a circuit breaker or the electrical low-voltage circuit which is to be protected can be realized by a (customizable) computer program product. Furthermore, changes and improvements of the function can as a result be loaded onto a circuit breaker individually.

According to the invention, a corresponding method with the same and further advantages is claimed for a circuit breaker for a low-voltage circuit having electronic (semiconductor-based) switching elements.

The method for a circuit breaker for protecting an electrical low-voltage circuit, having:

- a housing having at least one grid-side terminal and one load-side terminal,
- a mechanical break contact unit which is connected in series with an electronic interrupt unit, wherein the mechanical break contact unit is assigned to the load-side terminal and the electronic interrupt unit is assigned to the grid-side terminal,
- wherein the mechanical break contact unit can be switched by opening contacts for avoiding a current flow or closing the contacts for a current flow in the low-voltage circuit,
- wherein the electronic interrupt unit can be switched by semiconductor-based switching elements into a high-resistance state of the switching elements for avoiding a current flow or a low-resistance state of the switching elements for current flow in the low-voltage circuit,
- wherein the level of the current in the low-voltage circuit is determined, particularly between grid-side phase wire terminal and load-side phase wire terminal, wherein avoidance of a current flow of the low-voltage circuit is initiated when current or/and current-time limit values are exceeded,
- wherein a measuring impedance is provided between two wires of the low-voltage circuit, wherein on one side, the measuring impedance is connected to the connection between mechanical break contact unit and electronic interrupt unit.

To function test the circuit breaker when contacts of the mechanical break contact unit are open and the electronic interrupt unit is switched to high-resistance, the electronic interrupt unit is switched to a low-resistance state for a first time period.

With the polarity of the applied instantaneous value of the alternating voltage, i.e. the time of measurement, it is possible to determine whether a first semiconductor-based switching element (for a first voltage polarity) or a second semiconductor-based switching element (for a second voltage polarity) is being tested.

During the switching of the electronic interrupt unit to the low-resistance state for the first time period, the level of the voltage is determined across the electronic interrupt unit. If a/the second voltage threshold value is exceeded, a second fault condition exists, so the electronic interrupt unit becoming low-resistance a further time is avoided or/and closing of the contacts is avoided.

When contacts of the mechanical break contact unit are open and the electronic interrupt unit (EU) is switched to high-resistance, the level of the voltage across the electronic interrupt unit can further be determined. If a value falls below a/the first voltage threshold value, a first fault condition exists, so the electronic interrupt unit becoming low-resistance is avoided or/and closing of the contacts is avoided.

According to the invention, a corresponding computer program product is claimed. The computer program product comprises commands which, when the program is executed by a microcontroller, cause the microcontroller to improve the safety of a circuit breaker of this type or to achieve higher safety in the electrical low-voltage circuit which is to be protected by the circuit breaker.

The microcontroller is part of the circuit breaker, particularly the control unit.

According to the invention, a corresponding computer-readable storage medium is claimed, on which the computer program product is stored.

According to the invention, a corresponding data carrier signal is claimed, which the computer program product transmits.

All embodiments, both in dependent form referring back to the independent patent claims and also referring back only to individual features or feature combinations of patent claims, particularly also a back reference of the dependent arrangement claims to the independent method claim and vice versa, effect an improvement of a circuit breaker, particularly an improvement of the safety of a circuit breaker or the electrical circuit, and provide a novel concept for a circuit breaker.

The described properties, features and advantages of this invention and the manner in which these are achieved become clearer and more clearly understandable in connection with the following description of the exemplary embodiments that are explained in more detail in connection with the drawing.

DETAILED DESCRIPTION OF THE INVENTION

Figure 1:
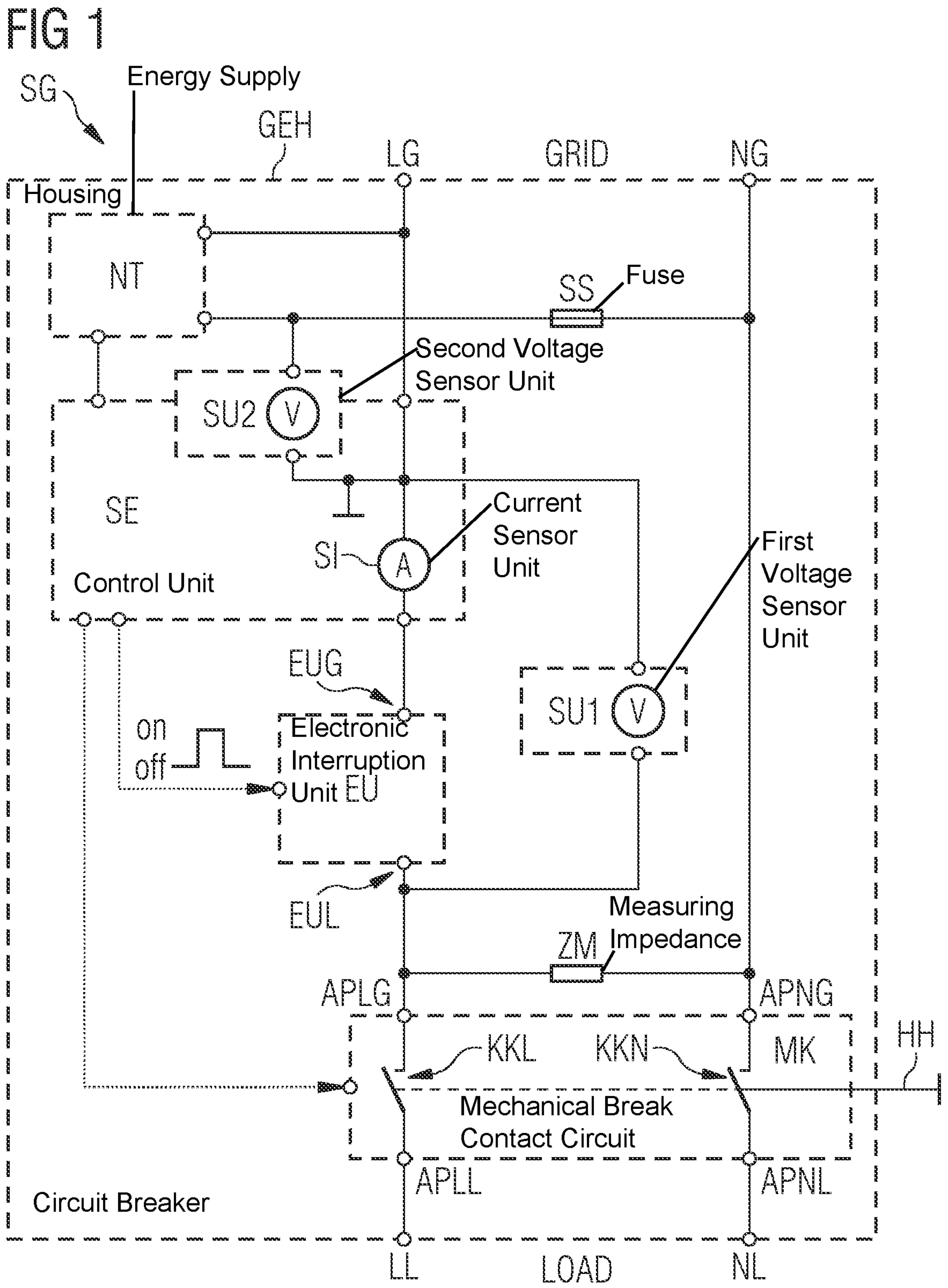
FIG. 1 shows a first illustration of a circuit breaker.

FIG. 1 shows an illustration of a circuit breaker SG for protecting an electrical low-voltage circuit, in particular low-voltage AC circuit, having a housing GEH, having:

- a grid-side neutral wire terminal NG, a grid-side phase wire terminal LG, a load-side neutral wire terminal NL, a load-side phase wire terminal LL of the low-voltage circuit;
- an energy source is usually connected at the grid side GRID,
- a consumer is usually connected at the load side LOAD;
- a (two-pole) mechanical break contact unit MK having load-side terminal points APLL, APNL and grid-side terminal points APLG, APNG,
- wherein a load-side terminal point APNL is provided for the neutral wire, a load-side terminal point APLL is provided for the phase wire, a grid-side terminal point APNG is provided for the neutral wire, a grid-side terminal point APLG is provided for the phase wire. The load-side terminal points APNL, APLL are connected to the load-side neutral and phase wire terminals NL, LL, so that it is possible to engage an opening of contacts KKN, KKL to avoid a current flow or a closing of the contacts for a current flow in the low-voltage circuit,
- an, in particular single-pole, electronic interrupt unit EU, (which in the single-pole design is arranged in the phase wire in particular),
- having a grid-side connecting point EUG which is in electrical connection with the grid-side phase wire terminal LG, and
- a load-side connecting point EUL which is in connection with or is connected to the grid-side terminal APLG of the mechanical break contact unit MK, wherein, due to semiconductor-based switching elements, the electronic interrupt unit has or can be switched to a high-resistance state of the switching elements for avoiding a current flow or a low-resistance state of the switching elements for current flow in the low-voltage circuit,
- a current sensor unit SI for determining the level of the current of low-voltage circuit, which is arranged in the phase wire in particular,
- a control unit SE which is connected to the current sensor unit SI, the mechanical break contact unit MK and the electronic interrupt unit EU, wherein avoidance of a current flow of the low-voltage circuit is initiated if current or/and current/time limit values are exceeded.

According to the invention, the circuit breaker is designed in such a manner that the level of the voltage can be determined across the electronic interrupt unit. That is to say, the level of a first voltage between grid-side connecting point EUG and load-side connecting point EUL of the electronic interrupt unit EU can be or is determined.

To this end, in the example according to FIG. 1, a first voltage sensor unit SU1 is provided, which is connected to the control unit SE and which determines the level of the voltage between grid-side connecting point EUG and load-side connecting point EUL of the electronic interrupt unit EU.

In the voltage measurement by the first voltage sensor unit SU1, the voltage can alternatively also be determined across the series circuit of electronic interrupt unit EU and current sensor SI, as illustrated in FIG. 1. The current sensor unit SI has a very low internal resistance, so the determination of the level of the voltage is not impaired or is impaired to a negligible extent.

According to the invention, a measuring impedance ZM is further connected between the grid-side terminal points APLG, APNG of the mechanical break contact unit MK. The measuring impedance ZM may for example be an electrical resistor or/and capacitor. The measuring impedance may further be an inductor. In particular, the measuring impedance may be a series circuit or parallel circuit of a resistor or/and capacitor or/and inductor.

Advantageously, a second voltage sensor unit SU2 can be provided, which determines the level of the voltage between grid-side neutral wire terminal NG and grid-side phase wire terminal LG.

The first voltage sensor unit can also be replaced, in that two voltage measurements are used (upstream of the electronic interrupt unit and downstream of the electronic interrupt unit). The voltage across the electronic interrupt unit is determined by subtraction.

Thus, a/the second voltage sensor unit SU2 can be provided, which is connected to the control unit SE and which determines the level of a second voltage between grid-side neutral wire terminal (NG) and grid-side phase wire terminal (LG). Furthermore, a third voltage sensor unit SU3 (not illustrated) can be provided, which is connected to the control unit and which determines the level of a third voltage between grid-side neutral wire terminal NG and load-side connecting point EUL of the electronic interrupt unit EU. The circuit breaker is designed in such a manner that the level of a/the first voltage between grid-side connecting point EUG and load-side connecting point EUL of the electronic interrupt unit EU is determined from the difference between second and third voltage.

In the example according to FIG. 1, the electronic interrupt unit EU is realized in a single-pole manner, for example in the phase wire. Here, the grid-side terminal point APNG for the neutral wire of the mechanical break contact unit MK is connected to the grid-side neutral wire terminal NG of the housing GEH.

The circuit breaker SG is advantageously designed in such a manner that the contacts of the mechanical break contact unit MK can be opened, but not closed by the control unit SE, which is indicated by an arrow from the control unit SE to the mechanical break contact unit MK.

The mechanical break contact unit MK can be operated by a mechanical handle HH on the circuit breaker SG, in order to engage a manual opening or a closing of the contacts KKL, KKN. The mechanical handle HH indicates the switching state (open or closed) of the contacts of the mechanical break contact unit MK.

Furthermore, the contact position (or the position of the handle, closed or open) can be transmitted to the control unit SE. The contact position (or the position of the handle) can be determined e.g. by means of a sensor.

The mechanical break contact unit MK is advantageously designed in such a manner that a (manual) closing of the contacts by the mechanical handle is only possible after an approval (enable), particularly an approval signal. This is likewise indicated by the arrow from the control unit SE to the mechanical break contact unit MK. That is to say, the contacts KKL, KKN of the mechanical break contact unit MK can only be closed by the handle HH if the approval or the approval signal (from the control unit) is present. Without the approval or the approval signal, although the handle HH can be actuated, the contacts are not closed ("permanent slider contacts").

The circuit breaker SG has an energy supply NT, for example a power supply unit. In particular, the energy supply NT is provided for the control unit SE, which is indicated in FIG. 1 by a connection between energy supply NT and control unit SE. The energy supply NI is connected (on the other side) to the grid-side neutral wire terminal NG and the grid-side phase wire terminal LG. A fuse SS, particularly a melting fuse, can advantageously be provided in the connection for the grid-side neutral wire terminal NG (or/and phase wire terminal LG).

Alternatively, the measuring impedance ZM can be connected to the grid-side neutral wire terminal NG via the fuse SS. Thus, a three-pole electronic unit EE (FIG. 5) can advantageously be realized, for example as a module, which has three terminal points, one neutral wire terminal point and two phase wire terminal points. The electronic unit EE for example has the electronic interrupt unit EU, the control unit SE, the energy supply NT (particularly including a fuse SS), the current sensor unit SI, the first voltage sensor unit SU1 and optionally the second voltage sensor unit SU2.

The low-voltage circuit may be a three-phase AC circuit having a neutral wire and three phase wires. For this, the circuit breaker can be designed as a three-phase variant and for example have further grid-side and load-side phase wire terminals. In each case, electronic interrupt units and voltage determinations (e.g. by first voltage sensor units) according to the invention are provided in an analogous manner between the further grid-side and load-side phase wire terminals, likewise contacts of the mechanical break contact unit.

The measuring impedance ZM should have a very high value (resistance or impedance value), in order to keep the losses low. For example, in the case of a resistance, a value of e.g. 1 Mohm. A value of 1 Mohm leads to losses of approximately 50 mW in a 230 V low-voltage circuit.

The measuring impedance should advantageously be greater than 100 kohms.

High-resistance means a state in which only a current of insignificant size still flows. In particular, high-resistance means resistance values of greater than 1 kilohm, better greater than 10 kilohms, 100 kilohms, 1 megohm, 10 megohms, 100 megohms, 1 gigaohm or greater.

Low-resistance means a state in which the current value indicated on the circuit breaker could flow. In particular, low-resistance means resistance values which are less than 10 ohms, better less than 1 ohm, 100 milliohms, 10 milliohms, 1 milliohm or less.

Figure 2:
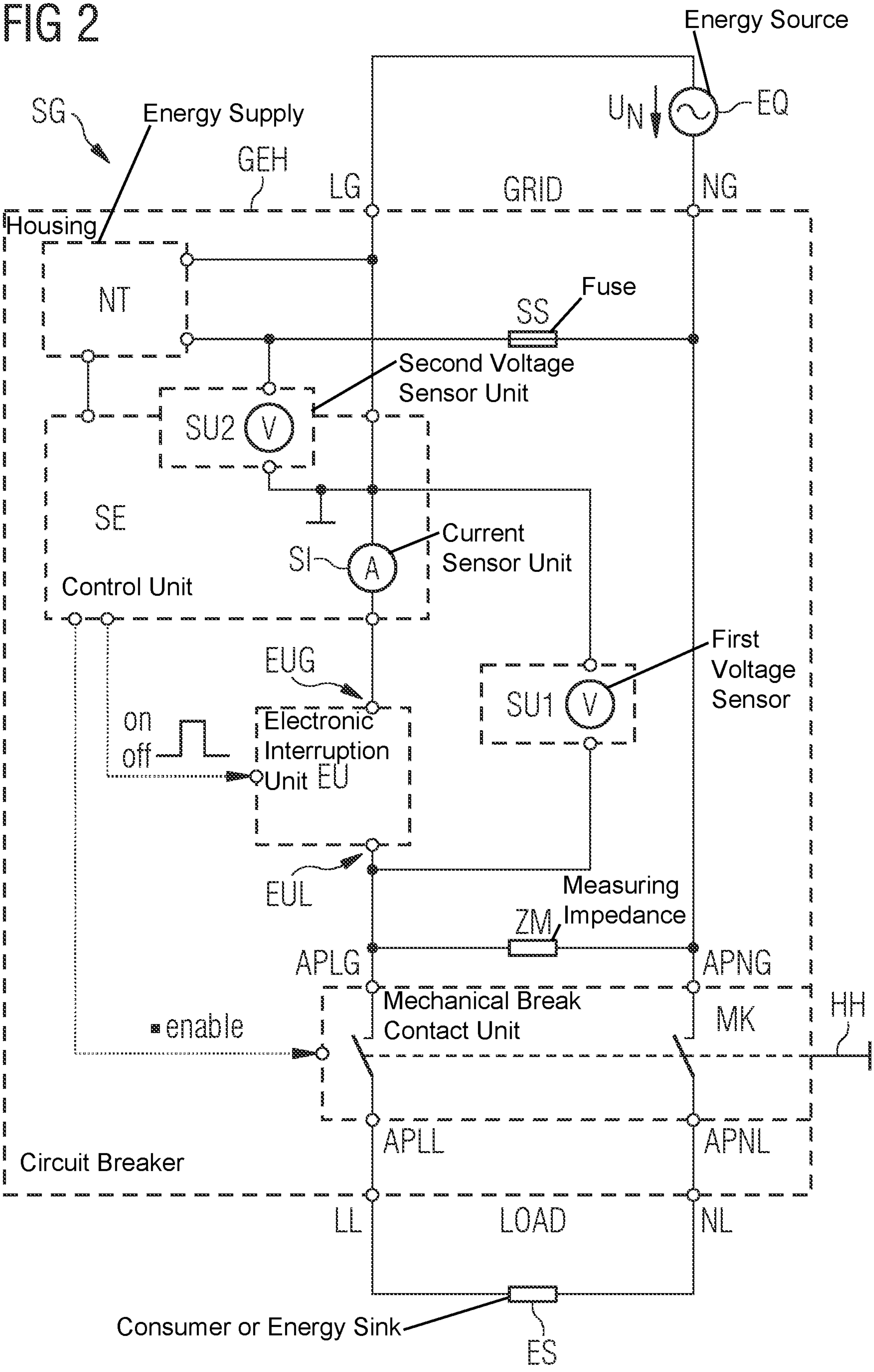
FIG. 2 shows a second illustration of a circuit breaker.

FIG. 2 shows an image according to FIG. 1, with the difference that on the grid side GRID, an energy source EQ is connected to a nominal voltage $U_N$ of the low-voltage circuit. Furthermore, on the load side LOAD, a consumer or energy sink ES is connected.

Furthermore, an approval signal enable is marked in the case of the connection from the control unit SE to the mechanical break contact unit MK.

The mechanical break contact unit MK is illustrated in an open state OFF, i.e. with open contacts KKN, KKL to avoid a current flow.

The circuit breaker SG operates for example in principle in such a manner that when the contacts of the mechanical break contact unit are closed and the interrupt unit is low-resistance, and

- when a current is determined, which exceeds a first current value, in particular in that the first current value is exceeded for a first time limit, the electronic interrupt unit EU becomes high-resistance and the mechanical break contact unit MK stays closed,
- when a current is determined, which exceeds a higher second current value, in particular for a second time limit, the electronic interrupt unit EU becomes high-resistance and the mechanical break contact unit MK is opened,
- when a current is determined, which exceeds an even higher third current value, the electronic interrupt unit becomes high-resistance and the mechanical break contact unit MK is opened.

Figure 3:
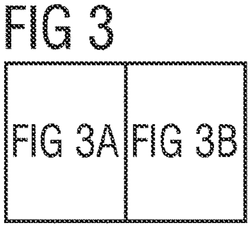
FIGS. 3A and 3B show a third illustration of a circuit breaker with first voltage curves.
Figure 3A:
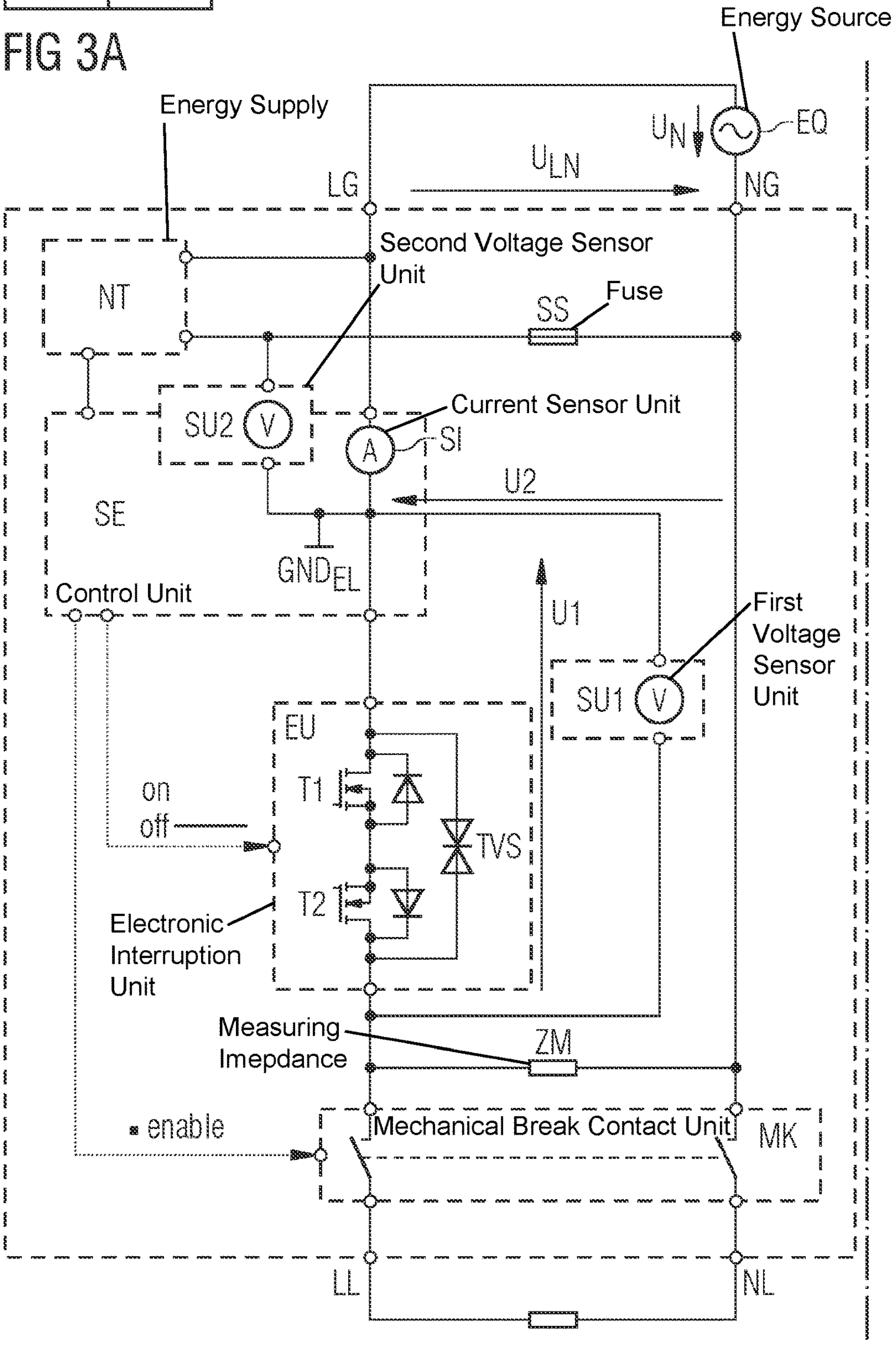
Figure 3B:
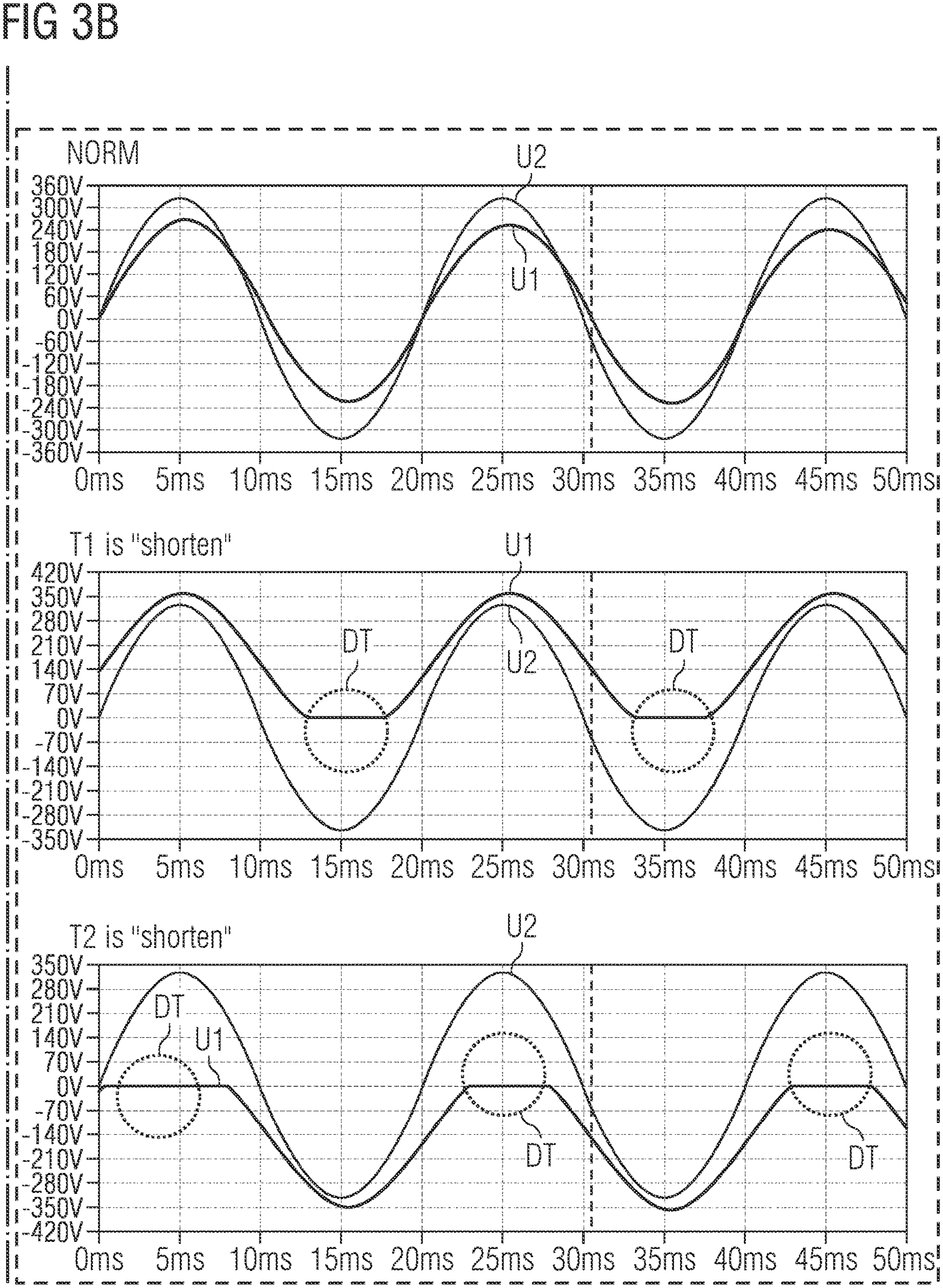

FIG. 3 shows an illustration according to FIG. 2, with various differences. The voltages at and in the circuit breaker are illustrated in more detail:

- the nominal voltage $U_N$ of the energy source EQ of the low-voltage circuit,
- the mains voltage $U_{LN}$ that is applied between grid-side neutral wire terminal NG and grid-side phase wire terminal LG,
- the second voltage U2 or $U_{N,GND}$ that is measured in the circuit breaker by the second voltage sensor unit SU2,
- the first voltage U1 or $U_{SW}$ that is measured using the first voltage sensor unit SU1 across the electronic interrupt unit EU.

In this variant according to FIG. 3, the first voltage U1 (or $U_{SW}$) is measured directly across the electronic interrupt unit (i.e. without current sensor unit SI). The second voltage U2 (or $U_{N,GND}$) corresponds to the mains voltage $U_{LN}$ minus the (minimum) voltage drop across the current sensor unit SI and the ohmic losses.

Furthermore, a detail of the electronic interrupt unit EU is illustrated, wherein the (single-pole) electronic interrupt unit EU has semiconductor-based switching elements T1, T2. In the example according to FIG. 3, two semiconductor-based switching elements T1, T2 are provided, which are connected in series. Advantageously, an overvoltage protector TVS is provided across the series connection of the two semiconductor-based switching elements T1, T2.

In the embodiment according to FIG. 3, two unidirectional electronic switching elements (antiserial) are connected in series. The first unidirectional switching element is here arranged in a switchable manner in a first current direction and the second unidirectional switching element is arranged in a switchable manner in the opposite current direction, wherein the unidirectional switching elements are conductive counter to their current switching direction (direct or indirect, e.g. by means of internal or external parallel-connected diodes). In particular, the circuit breaker is designed in such a manner that the first and the second switching element are switchable independently of one another.

In the following, the following situation is considered:

nominal voltage or mains voltage (e.g. 230 V AC) is applied at the grid-side terminal LG, NG or grid side GRID or mains terminal of the circuit breaker, a consumer or energy sink ES or load is connected at the load side LOAD of the circuit breaker, In the first step, the check in the OFF state of the electronic protective device should be considered.

To this end:

The mechanical break contact unit is open (contacts open)

The electronic interrupt unit is switched off (semiconductor-based switching elements high-resistance)

The control unit (incl. controller unit) is active

The electrical potential between the electronic interrupt unit and the mechanical break contact unit is defined by the measuring impedance ZM and the impedance of the electronic interrupt unit in the switched-off state (voltage divider).

The control unit can then switch on the semiconductor-based switching elements (which of the two semiconductors is active?) at any desired time (and thus for a certain voltage sharing (depending on the instantaneous value of the voltage, half-wave of the voltage). Herewith, the switching elements of the electronic interrupt unit EU can be tested, taking account of the polarity of the alternating voltage or AC voltage.

The electronic interrupt unit EU (or the electronic switch) is therefore switched on for e.g. a very short time (in the millisecond range). If the electronic interrupt unit is operational, this can be determined by the (simultaneous) voltage measurement (e.g. first voltage sensor unit, second voltage sensor unit) and (subsequent) evaluation. For example, in the case of a defective semiconductor-based switching element, it is possible to determine whether it always stays switched on (fault pattern: "broken down") or always stays switched off (fault pattern: "blown").

Thus, two typical and frequent fault patterns are covered.

If the check is fault-free, a (first) approval condition for switching on the circuit breaker, specifically the electronic interrupt unit or the mechanical break contact unit, may exist.

If the check is not fault-free, no approval to switch on the circuit breaker will take place, a fault condition exists, so that the outgoing circuit or consumer/load cannot be switched on and therefore a dangerous state is prevented.

The circuit breaker is designed in such a manner that when contacts of the mechanical break contact unit MK are open and the electronic interrupt unit EU is switched to high-resistance, the level of the voltage across the electronic interrupt unit, i.e. the first voltage U1, is determined. If a value falls below a first voltage threshold value, a first fault condition exists, so the electronic interrupt unit becoming low-resistance is avoided or/and closing of the contacts is avoided. With regard to the mechanical break contact unit MK, an approval signal enable is for example not output from the control unit SE to the mechanical break contact unit MK.

Three voltage curves over time which correspond to this are illustrated on the right side of FIG. 3. The level of the voltage in volts is plotted on the vertical y axis and the time in milliseconds (ms) is plotted on the horizontal x axis. In each case, the curve of the level of the first voltage U1 and the level of the second voltage U2 over time is displayed.

In the first top graph, NORM, the voltage curves for a fault-free state of the electronic interrupt unit EU are displayed. The difference of the amplitude between first voltage U1 and second voltage U2 is in this case caused by the voltage drop across the measuring impedance ZM. The first voltage threshold value should be oriented by the size of the measuring impedance. The first voltage threshold value should for example be somewhat smaller than the nominal voltage minus the voltage drop across the measuring impedance. If the first voltage U1 is greater than the first voltage threshold value, a fault-free electronic interrupt unit EU is present. The evaluation can take place based on the instantaneous values of the voltage and on the effective values of the voltage. If the first voltage U1 is greater than the first voltage threshold value, a first approval condition therefore exists, as a consequence of which the electronic interrupt unit may become low-resistance or/and closing of the contacts of the mechanical break contact unit is enabled. This is illustrated in FIG. 3 by an arrow from the control unit SE to the mechanical break contact unit MK, with the label enable, for the approval of the closing of the contacts of the mechanical break contact unit MK by the handle HH. The connection or the arrow from the control unit SE to the electronic interrupt unit EU has a representation of a curve of the switching state of the electronic interrupt unit over time, in which a switched-off/high-resistance state is labeled with off and a switched-on/low-resistance state of the electronic interrupt unit EU is labeled with on. In the example, the electronic interrupt unit EU is in the switched-off state off, which is represented by a straight-lined dash next to 'off'.

In the second central graph, 'T1 is "shorted"', the voltage curve for a defective electronic interrupt unit EU is displayed, in which in the example, a semiconductor-based switching element, the switching element T1 in the example, is always conductive (broken down/short-circuited). As a result, a current flows through the electronic interrupt unit in a half-wave of the electric voltage, although the interrupt unit is actually (should be) high-resistance. The conductivity in the relevant current direction through the affected semiconductor-based switching element prevents the build-up of a voltage across the relevant semiconductor-based switching element. That is to say, the level of the first voltage U1 cannot exceed the first voltage threshold value, which can be determined by means of the first voltage sensor unit SU1 in connection with the control unit SE. This is indicated in FIG. 3 by the abbreviation DI.

In the third bottom graph, 'T2 is "shorted"', the voltage curve for a defective electronic interrupt unit EU is displayed, in which the other semiconductor-based switching element, the switching element T2 in the example, is always conductive (broken down/short-circuited). That which was said for the central graph applies analogously.

In the second and third graphs, a fault state of the electronic interrupt unit EU is displayed, which can be found according to the invention in the case of closed contacts of the mechanical break contact unit and low-resistance interrupt unit prior to the closing of the contacts of the mechanical break contact unit and prevents manual closing of the contacts of the mechanical break contact unit.

This is explained once more in other words. FIG. 3 shows an overview for the circuit diagram and voltage curves for the case that a switching element in the electronic interrupt unit is defective and in this case is broken down/short-circuited. As unidirectionally blocking power semiconductors are typically used, it is possible to test the semiconductor-based switching element T1 or T2 for functionality depending on the applied voltage polarity. If an alternating voltage is applied at the terminals of an operational circuit breaker, a voltage U1 or $U_{SW}$ is created across the electronic interrupt unit, which voltage can be determined by means of a corresponding first voltage sensor unit SU1. This is displayed in the top graph, NORM. If one of the two switching elements is broken down, the voltage can no longer be carried by the electronic interrupt unit. The measured voltage becomes zero here for a certain time period (approx. 5 ms). This is displayed in the two curves 'T1 is "shorted"' and 'T2 is "shorted"'. This allows the measurement or the detection of a defective switching element. If both switching elements are broken down, the first voltage U1 or $U_{SW}$ is always zero (not displayed).

Figure 4:
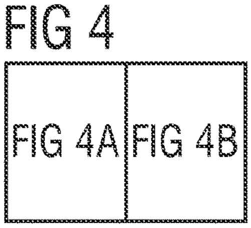
FIGS. 4A and 4B show a fourth illustration of a circuit breaker with second voltage curves.
Figure 4A:
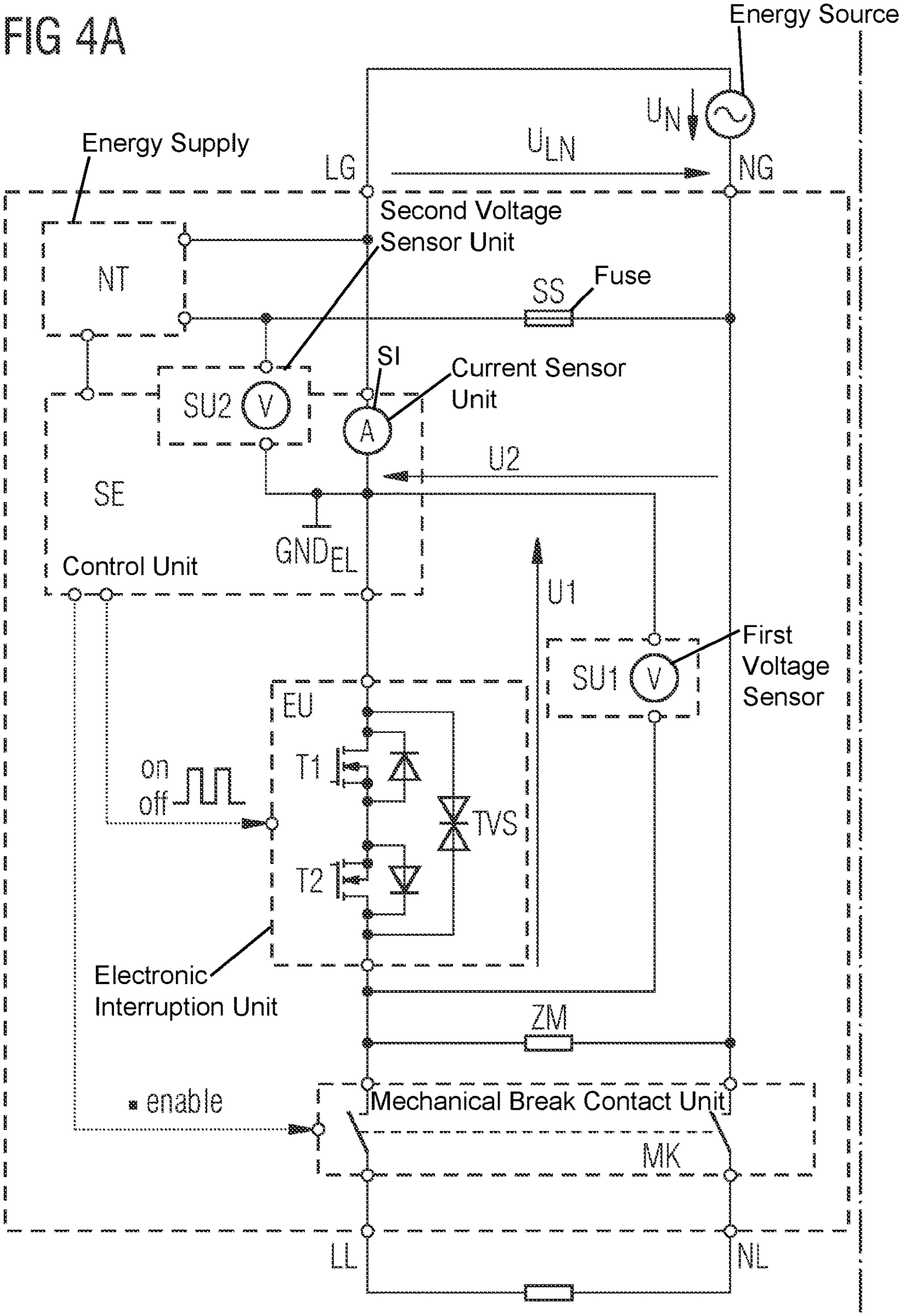
Figure 4B:
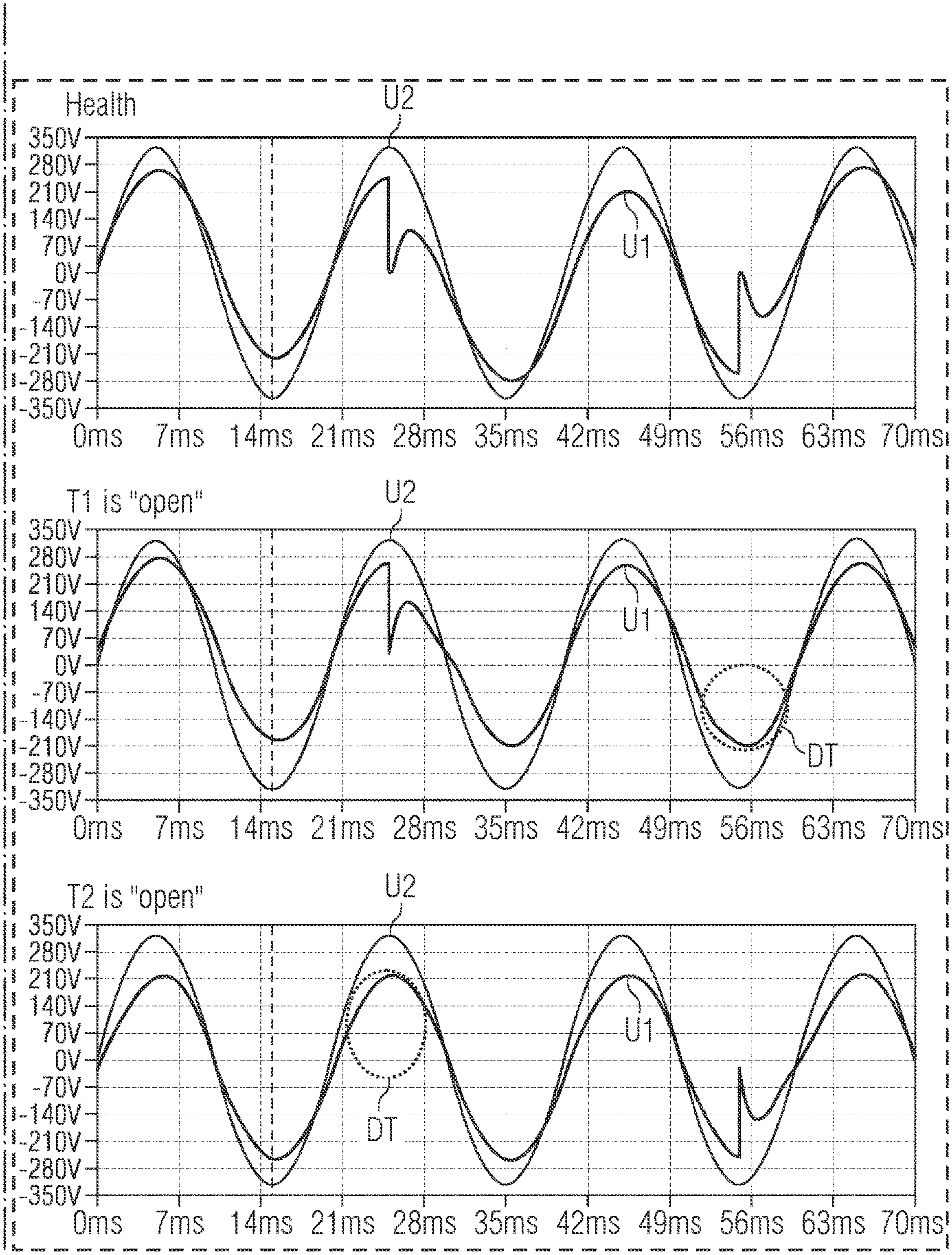

FIG. 4 shows an illustration according to FIG. 3, with the difference that the electronic interrupt unit EU is switched on and off transiently. This is indicated by a square wave signal with regard to the states off and on at the connection between control unit SE and electronic interrupt unit EU.

On the right side of FIG. 4, three graphs are again displayed according to FIG. 3. Voltage curves are shown for the case that a switching element in the electronic interrupt unit is defective and in this case is blown/open. As unidirectionally blocking power semiconductors are typically used, it is possible for the switching element T1 or T2 to be tested for functionality depending on the applied voltage polarity.

If an alternating voltage is applied grid-side at the operational circuit breaker, a voltage U1 or $U_{SW}$ is created across the electronic interrupt unit, which voltage can be measured by means of a corresponding voltage measurement (first voltage sensor unit SU1). This is displayed in the top curves "Health".

In order to check whether one of the two semiconductor-based switching elements is blown, a short switch-on pulse is sent, first time period. If one of the two switching elements contained is blown, the switching element can no longer be switched on by the electronic interrupt unit. Then, the measured voltage always stays as in the switched-off state, even when switched on. This is displayed in the central graph 'T1 is "open"' and the bottom graph 'T2 is "open"'. This allows the measurement or the detection of a defective switching element.

That is to say, the switching element is designed in such a manner that when contacts of the mechanical break contact unit MK are open and the electronic interrupt unit EU is switched to high-resistance, the electronic interrupt unit EU is switched to a low-resistance state for a first time period and the level of the voltage across the electronic interrupt unit is determined.

If a second voltage threshold value is exceeded, a second fault condition exists, so the electronic interrupt unit becoming low-resistance is avoided or/and closing of the contacts is avoided.

The circuit breaker is advantageously designed in such a manner that when a fault condition exists, closing of the contacts of the mechanical break contact unit MK is avoided. In particular, no approval signal (enable) is output to the mechanical break contact unit MK.

Figure 5:
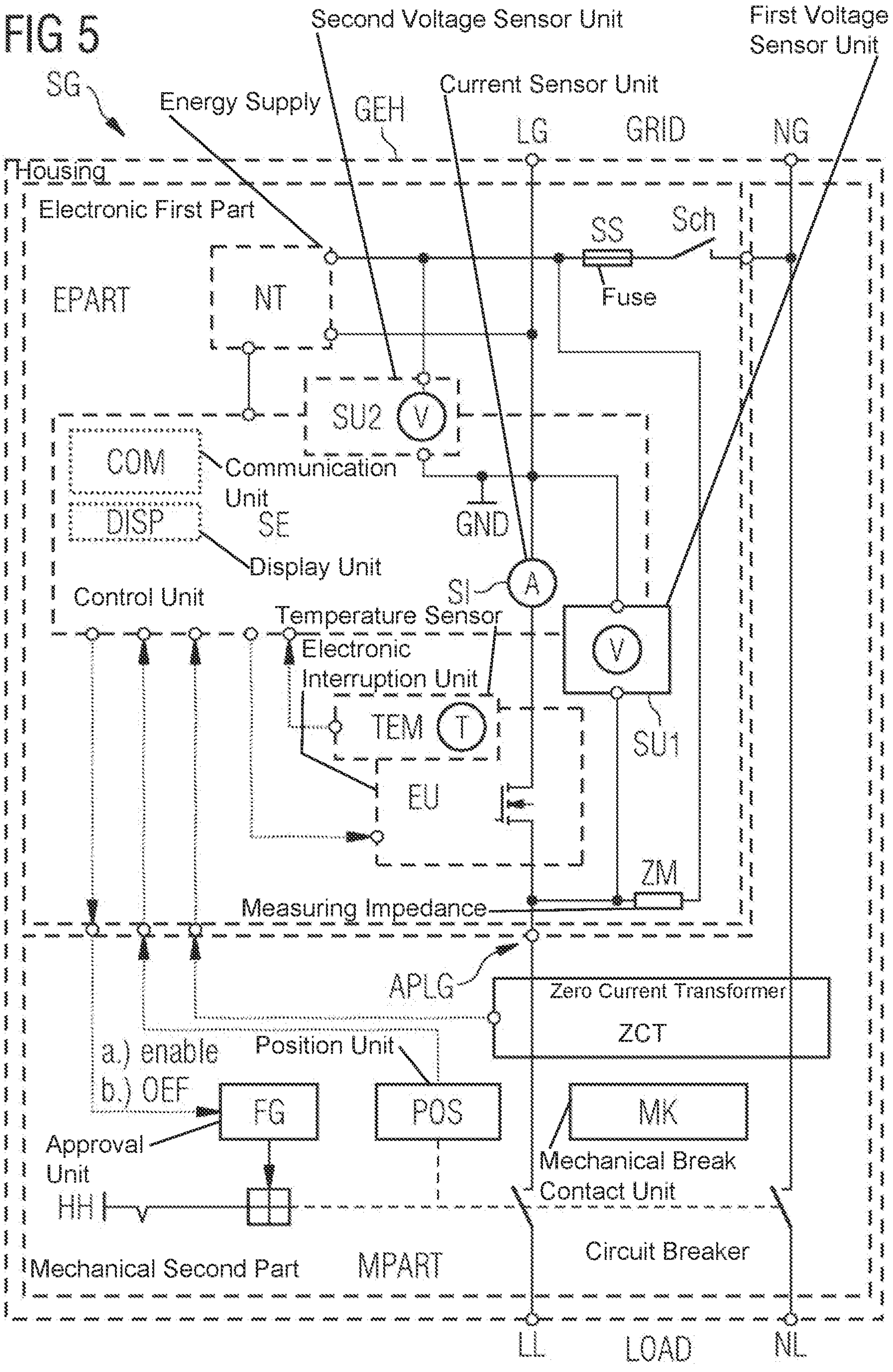
FIG. 5 shows a fifth illustration of a circuit breaker.

FIG. 5 shows an illustration according to FIGS. 1 to 4, with the difference that the circuit breaker is constructed in two parts. It contains an electronic first part EPART, for example on a printed circuit board. The first part EPART may have the control unit SE, the first voltage sensor unit SU1, the second voltage sensor unit SU2, the current sensor unit SI, the electronic interrupt unit EU, the energy supply NT. Furthermore, the first part can have the melting fuse SS, a switch SCH, the measuring impedance ZM, a temperature sensor TEM (in particular for the electronic interrupt unit EU), a communication unit COM, a display unit DISP.

The first part EPART has only three terminals:
- the grid-side phase wire terminal LG,
- a terminal for the or to the grid-side phase wire terminal point APLG of the mechanical break contact unit MK,
- a terminal for a connection for the neutral wire terminal NG.

The circuit breaker contains a, particularly mechanical, second part MPART. The second part MPART may have the mechanical break contact unit MK, the handle HH, an approval unit FG and a zero current transformer ZCT. Furthermore, the second part may have a position unit POS for reporting the position of the contacts of the mechanical break contact unit MK to the control unit, and also the (neutral wire) connection(s). Further units which are not mentioned in any more detail may be provided.

Due to the division in two, a compact circuit breaker according to the invention can advantageously be realized.

The approval unit FG effects an approval of the activation of the contacts of the mechanical break contact unit by the handle HH if an approval signal enable is present.

In the following, the invention shall be summarized once again and explained in more detail.

An electronic protective and switching device is proposed by way of example, having:
- a housing having grid-side and load-side terminals
- a voltage sensor unit
- a current sensor unit for measuring the (load) current
- a mechanical break contact unit incl. handle (incl. indication of the contact position, trigger by the electronics, disconnector properties)
- electronic interrupt unit having semiconductor-based switching elements
- control unit
- the functionality of the electronic interrupt unit is checked,
- by the continuous measurement of the voltage across the electronic interrupt unit. It is possible here, e.g. in the switched-on state, to determine whether e.g. a semiconductor component is blown.
- in that the electronic interrupt unit is transiently (<10 ms, preferably <1 ms, generally: <20 ms, 50 ms, 100 ms, 200 ms, 500 ms or 1 s) switched on and immediately switched off again when the contacts are open,
- and at the same time, measured voltage values and/or measured current values are detected and these are analyzed such that a broken down or blown electronic interrupt unit is detected or broken down or blown switching elements are detected.

Advantageously, initially measurement is carried out, then switching and measurement.

A first voltage sensor unit/voltage measurement unit across the electronic interrupt unit is proposed, in order to determine the voltage across the electronic interrupt unit. Alternatively, a third voltage sensor unit can be provided, parallel to the second voltage sensor unit, which is provided at the load-side terminal of the electronic interrupt unit, i.e. between electronic interrupt unit and mechanical break contact unit, wherein this is connected on one side to the phase wire and on the other side to the 9 neutral wire. The first voltage can be determined from the subtraction of the voltages between second and third voltage sensor unit. The first voltage sensor unit can be dispensed with in this case.

An additional measuring impedance is proposed, which is applied between the two wires/current paths (phase wire L and neutral wire N), in order to define the electrical potential between the electronic interrupt unit EU and the mechanical break contact unit for measuring purposes (no "floating" potential).

A computer program product or algorithm is proposed, which switches the electronic interrupt unit or the semiconductor-based switching elements on and off at suitable times (instantaneous values of the mains voltage) and at the same time evaluates the measured current and voltage values, in order to detect that the electronic interrupt unit is operational or non-operational.

The control unit SE can have a microcontroller (to this end). The computer program product can be executed on the microcontroller. The computer program product comprises commands which, during the execution of the program by the microcontroller, cause the microcontroller to control the circuit breaker, particularly to support, in particular to carry out, the method according to the invention.

The computer program product can be stored on a computer-readable storage medium, such as a CD-ROM, a USB stick or similar.

A data carrier signal which transmits the computer program product may further exist.

A mechanical break contact unit is proposed, which cannot be switched on unless the control unit sends an approval signal "enable".

The time for the switching of the semiconductor-based switching elements (for the checking) is guided by the polarity of the currently applied mains voltage, so individual switching elements can be checked in a targeted manner. Furthermore, the instantaneous value of the voltage can be taken into account in the selection of the time.

In particular:

- the first time period is: very short to short, 10 us to 1 s,
- the first voltage threshold value is: 5-10% of the effective value/RMS value of the mains voltage or applied alternating voltage or the instantaneous value of the alternating voltage; e.g. 10-20 V,
- the second voltage threshold value is: smaller than 1 volt, Summarized:

- voltage measurement across the electronic interrupt unit or determination of the voltage drop across the electronic interrupt unit EU (e.g. by means of a simple voltage divider),
- high-resistance measuring impedance (preferably R and/or C) for fixing the electrical potential between electronic interrupt unit and mechanical break contact unit
- voltage determination across the electronic interrupt unit is used in order: to detect a broken down or blown state of a power semiconductor
- approval of the option to switch on the mechanical break contact unit after fault-free testing of the electronic interrupt unit Although the invention was illustrated and described in more detail by the exemplary embodiment, the invention is not limited by the disclosed examples and other variations can be deduced from this by a person skilled in the art without departing from the protective scope of the invention.

The invention claimed is:

1. A circuit breaker for protecting an electrical low-voltage circuit, the circuit breaker comprising:

- a housing having at least one grid-side terminal and at least one load-side terminal;
- an electronic interrupt unit associated with said at least one grid-side terminal;
- a mechanical break contact unit connected in series with said electronic interrupt unit, said mechanical break contact unit being associated with said at least one load-side terminal, and said mechanical break contact having contacts;
- said mechanical break contact unit configured to be switched by opening said contacts for avoiding a current flow or closing said contacts for permitting the current flow in the low-voltage circuit;
- said electronic interrupt unit configured to be switched by semiconductor-based switching elements into a high-resistance state of said semiconductor-based switching elements for avoiding the current flow or a low-resistance state of said semiconductor-based switching elements for permitting the current flow in the low-voltage circuit;
- a current sensor unit for determining a current level of the low-voltage circuit;
- a control unit connected to said current sensor unit, to said mechanical break contact unit and to said electronic interrupt unit, for initiating avoidance of the current flow of the low-voltage circuit upon exceeding at least one of current or current/time limit values;
- a measuring impedance provided between two wires of the low-voltage circuit, said measuring impedance having one side connected to a connection between said mechanical break contact unit and said electronic interrupt unit; and
- said electronic interrupt unit being switched to the low-resistance state for a first time period to function test the circuit breaker, upon said contacts of said mechanical break contact unit being open and said electronic interrupt unit being switched to high-resistance.

2. The circuit breaker according to claim 1, wherein a voltage level is determined across said electronic interrupt unit for one wire.

3. The circuit breaker according to claim 2, wherein:

- the voltage level across said electronic interrupt unit is determined upon said electronic interrupt unit being switched to high-resistance and said contacts of said mechanical break contact unit being open; and
- at least one of said electronic interrupt unit becoming low-resistance is avoided or closing of said contacts is avoided, upon existence of a value falling below a first voltage threshold value and a first fault condition.

4. The circuit breaker according to claim 3, wherein:

- the voltage level is determined across said electronic interrupt unit during the switching of said electronic interrupt unit to the low-resistance state for the first time period; and
- upon exceeding a second voltage threshold value, a second fault condition exists, causing at least one of said electronic interrupt unit becoming low-resistance a further time to be avoided or closing of the contacts to be avoided.

5. The circuit breaker according to claim 4, wherein closing of said contacts of said mechanical break contact unit is avoided and no approval signal is output to said mechanical break contact unit, upon existence of the first or second fault condition.

6. The circuit breaker according to claim 1, which further comprises a first voltage sensor unit connected to said control unit for determining a level of a first voltage between a grid-side connecting point and a load-side connecting point of said electronic interrupt unit.

7. The circuit breaker according to claim 1, which further comprises:

- a first voltage sensor unit connected to said control unit for determining a level of a first voltage between a grid-side neutral wire terminal and a grid-side phase wire terminal; and a second voltage sensor unit connected to said control unit for determining a level of a second voltage between the grid-side neutral wire terminal and a load-side connecting point of said electronic interrupt unit;

a level of a third voltage between a grid-side connecting point and said load-side connecting point of said electronic interrupt unit being determined from a difference between the first and second voltages.

8. The circuit breaker according to claim 1, wherein said current sensor unit is provided at the low-voltage circuit between a grid-side phase wire terminal and a load-side phase wire terminal.

9. The circuit breaker according to claim 1, wherein said measuring impedance is at least one of an electrical resistor or a capacitor.

10. The circuit breaker according to claim 1, which further comprises, for the low-voltage circuit being a three-phase AC circuit:

a plurality of grid-side and load-side phase wire terminals;

said electronic interrupt unit being one of a plurality of electronic interrupt units;

one of said contacts of said mechanical break contact unit and said plurality of electronic interrupt units being connected between said plurality of grid-side and load-side phase wire terminals; and first voltage sensor units for determining a voltage level across each respective one of said plurality of electronic interrupt units.

11. The circuit breaker according to claim 1, wherein said control unit is configured to open but not to close said contacts of said mechanical break contact unit.

12. The circuit breaker according to claim 1, which further comprises a mechanical handle for operating said mechanical break contact unit to engage the opening of said contacts or the closing of said contacts.

13. The circuit breaker according to claim 12, wherein said mechanical break contact unit is configured to only permit a closing of said contacts by said mechanical handle after an approval or an approval signal.

14. The circuit breaker according to claim 1, wherein, upon said contacts of said mechanical break contact unit being closed and said interrupt unit being low-resistance:

said electronic interrupt unit becomes high-resistance and said mechanical break contact unit stays closed, upon determining a current exceeding a first current value for a first time limit, said electronic interrupt unit becomes high-resistance and said mechanical break contact unit is opened, upon determining the current exceeding a second current value for a second time limit, and said electronic interrupt unit becomes high-resistance and said mechanical break contact unit is opened, upon determining the current exceeding a third current value.

15. The circuit breaker according to claim 1, wherein said control unit has a microcontroller.

16. A method for operating a circuit breaker for protecting an electrical low-voltage circuit, the method comprising:

providing a housing having at least one grid-side terminal and at least one load-side terminal;

providing an electronic interrupt unit and associating the electronic interrupt unit with the at least one grid-side terminal;

connecting a mechanical break contact unit in series with the electronic interrupt unit and associating the mechanical break contact unit with the at least one load-side terminal;

switching the mechanical break contact unit by opening contacts for avoiding a current flow or closing the contacts for permitting the current flow in the low-voltage circuit;

switching the electronic interrupt unit by using semiconductor-based switching elements into a high-resistance state of the switching elements for avoiding the current flow or a low-resistance state of the switching elements for permitting the current flow in the low-voltage circuit;

determining a current level in the low-voltage circuit between a grid-side phase wire terminal and a load-side phase wire terminal, and initiating avoidance of the current flow of the low-voltage circuit upon exceeding at least one of current or current/time limit values;

providing a measuring impedance between two wires of the low-voltage circuit, and connecting one side of the measuring impedance to a connection between the mechanical break contact unit and the electronic interrupt unit; and switching the electronic interrupt unit to the low-resistance state for a first time period to function test the circuit breaker when the contacts of the mechanical break contact unit are open and the electronic interrupt unit is switched to high resistance.

17. The method according to claim 16, which further comprises:

determining a voltage level across the electronic interrupt unit when the contacts of the mechanical break contact unit are open and the electronic interrupt unit is switched to high-resistance; and avoiding at least one of the electronic interrupt unit becoming low-resistance or closing of the contacts, upon a value falling below a first voltage threshold value and existence of a first fault condition.

18. The method according to claim 17, which further comprises:

determining the voltage level across the electronic interrupt unit during the switching of the electronic interrupt unit to the low-resistance state for the first time period; and avoiding at least one of the electronic interrupt unit becoming low-resistance again or closing of the contacts, upon exceeding a second voltage threshold value and existence of a second fault condition.

19. The method according to claim 18, which further comprises avoiding manual closing of the contacts by using a handle of the mechanical break contact unit when the first or second fault condition exists.

20. A non-transitory computer program product comprising commands which, during an execution of a program by a microcontroller, cause the microcontroller to support or carry out the method according to claim 16 using the circuit breaker including:

the housing;

the electronic interrupt unit;

the mechanical break contact unit;

a current sensor unit for determining the current level of the low-voltage circuit;

a control unit connected to the current sensor unit, to the mechanical break contact unit and to the electronic interrupt unit, for initiating the avoidance of the current flow of the low-voltage circuit upon exceeding at least one of the current or the current/time limit values; and the measuring impedance.

21. A computer-readable storage medium, on which the non-transitory computer program product according to claim 20 is stored.

22. A data carrier signal which transmits the computer program product according to claim 20.

* * * * *